(12) United States Patent
Gorzynski et al.

(10) Patent No.: US 8,330,791 B2
(45) Date of Patent: Dec. 11, 2012

(54) VIDEO CONFERENCE SYSTEM WITH SYMMETRIC REFERENCE

(75) Inventors: Mark E. Gorzynski, Corvallis, OR (US); David R. McKinney, West Jordan, UT (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1625 days.

(21) Appl. No.: 11/799,277

(22) Filed: Apr. 30, 2007

(65) Prior Publication Data

US 2008/0266380 A1    Oct. 30, 2008

(51) Int. Cl.
*H04N 7/14* (2006.01)

(52) U.S. Cl. .............. 348/14.07; 348/14.08; 348/14.11; 348/14.16; 370/260; 370/265; 370/270; 379/202.01; 709/201

(58) Field of Classification Search .......... 370/259–271, 370/351–356; 709/201–207, 217–248; 348/14.01–14.16
See application file for complete search history.

(56) References Cited

U.S. PATENT DOCUMENTS

| | | | |
|---|---|---|---|
| 4,400,724 A * | 8/1983 | Fields | 348/14.1 |
| 5,359,362 A | 10/1994 | Lewis et al. | |
| 6,160,573 A | 12/2000 | Allen et al. | |
| 6,882,358 B1 | 4/2005 | Schuster et al. | |
| 6,909,451 B1 | 6/2005 | Latypov et al. | |
| 7,119,829 B2 * | 10/2006 | Leonard et al. | 348/14.16 |
| 7,679,639 B2 * | 3/2010 | Harrell et al. | 348/14.08 |
| 7,707,247 B2 * | 4/2010 | Dunn et al. | 709/204 |
| 2005/0052338 A1 | 3/2005 | Suzuki et al. | |
| 2005/0264648 A1 * | 12/2005 | Ivashin et al. | 348/14.09 |
| 2006/0200518 A1 * | 9/2006 | Sinclair et al. | 709/204 |
| 2007/0206091 A1 * | 9/2007 | Dunn et al. | 348/14.08 |

* cited by examiner

*Primary Examiner* — Hemant Patel

(57) ABSTRACT

A video conference system includes a first video conference environment, and a second video conference environment linked to the first video conference environment. Each video conference environment has a conference view direction and a reference view direction, the reference view directions being symmetrically oriented with respect to the conference view directions.

20 Claims, 10 Drawing Sheets

US 8,330,791 B2

VIDEO CONFERENCE SYSTEM WITH SYMMETRIC REFERENCE

BACKGROUND

The present invention relates generally to video conferencing systems that allow remote collaboration. Interconnected video conferencing rooms are typically "handed". That is, a reference item, such as a white board or data display, will be on one side of the room relative to the video conference display that shows the conference participants. In a video conferencing room, people typically face each other via the video conference display in one direction. Depending upon the viewpoint of the video conference camera in the room, there will be one direction or "hand" on which other materials are positioned with respect to this camera. If the white board or data display is to the left of the camera, this is a "left-handed" room. If the white board or data display is to the right of the camera, this is a "right-handed" room.

Where connected rooms have this sort of geometric "handedness", it will be apparent that reference directions will have a reverse symmetry. That is, since video conferees effectively "face" each other via opposing video images, objects on the actual left hand side of one of the participants would appear toward the right hand side of the video image viewed by the other participant. Thus, rooms that are like handed (left and left) cannot be interconnected in a way that preserves the natural geometry of the interaction. If two left-handed rooms are connected, when the first participant turns to his left to refer to media materials, the second participant will see the first person turning to the second person's right, which will be away from the direction of the media materials. Maintaining the natural geometry of a remote conference interaction can be desirable to make a video conference environment more like an actual in-person conference session.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein.

DETAILED DESCRIPTION

Figure 1:
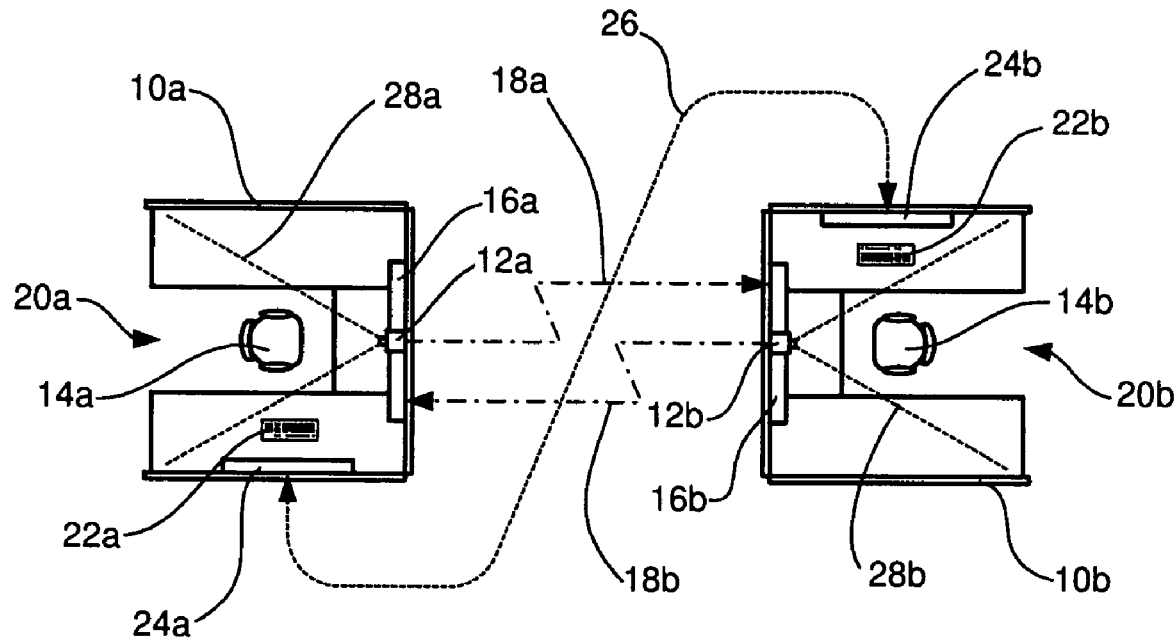
FIG. 1 is a plan view of a pair of like cubicles that are interconnected in a video conference arrangement where the reference direction is asymmetric.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Recent technological and economic developments have helped make the use of video conferencing for remote collaboration more and more common. Video conferences are now routinely engaged between conference rooms, small cubicles, and other work environments throughout the world. Shown in FIG. 1 is a plan view of a pair of like cubicles 10 that are remote from each other (e.g. at different locations—whether in a single building or on different continents) and interconnected in a video conference arrangement. For reference purposes, like items in each cubicle are labeled with reference letters "a" and "b". Each cubicle includes a camera 12 (labeled 12a, 12b, respectively), for taking an image of the conference participant (e.g. seated in the chair 14) and the surrounding environment, and a video display device 16 (e.g. CRT, LCD display, plasma screen, etc.).

While these video conference environments 10 are shown as cubicles, they could be fully enclosed rooms or some other type of environment. As used herein, the terms "room" and "cubicle" are intended to be interchangeable, and refer to any type of video conference environment. For example, a video conference "room" could be created through the use of fabric screens or other backdrop items, or using chromakey screens that allow a video or computer generated backdrop to be virtually inserted behind a participant through video segmentation technology or the like. The principles discussed herein that apply to cubicles also apply to rooms, such as conference rooms, and vice versa. While an enclosed or partially enclosed room or space of some kind is frequently desirable, video conferences can be done in other environments.

Logical interconnections of the video conference elements are shown by dashed lines in FIG. 1. The image taken by each camera 12 is transmitted to the video conference display device 16 of the opposing cubicle, as represented by the dashed lines 18, so that each conference participant can see the other participant. Though not represented, it will be apparent that audio transmission between the cubicles is typically also provided to allow the participants to speak with and hear each other.

In the basic video conference cubicle 10 shown in FIG. 1, the video conference display devices 16 are depicted as relatively large flat panel screens. In such a configuration the interaction between the conference participants can be made to seem almost as if the participants are in physically adjacent cubicles with a glass window between them, providing the look and feel of an actual in-person conference session. This sort of configuration is believed to enhance the effectiveness of remote collaboration.

Maintaining the look and feel of an in-person conference session becomes more complicated when a reference direction is introduced. It can be desirable to provide a collaboration session where people see each other through one "wall" (e.g. a video conference screen located on a wall) and work on or refer to media materials (e.g. a white board or data display) facing in another direction. As noted above, video conference rooms that are like-handed cannot be interconnected in a way that preserves the natural geometry of interaction with respect to the reference direction because opposing video images require a mirror image alignment of other items in the respective rooms.

The cubicles 10 of FIG. 1 are alike in that their geometry is the same. Each has a U-shaped configuration with the video conference display screens 16 opposite the entry side 20, and a computer workstation 22 to the right as one enters the cubicle. Each computer workstation includes a display device 24, which can be used to display reference materials (e.g. images, data, etc.) for the conference participants. This display device is referred to as a reference display. With respect to the video conference display 16, the position of the reference display is referred to as the reference direction. These workstations are interconnected, as represented by the dashed line 26, allowing the conference participants to refer to and manipulate common data information (e.g. text, graphics, etc.) during their conference. The reference display 24 can be positioned outside the visual range (represented by dashed lines 28) of each video conference camera 12 so as to reduce interference (e.g. not requiring phase linkage to reduce apparent flicker in the opposing image), or it can be within the visual range of the camera. These cubicles are thus both right-handed because the direction to the reference display is physically to the right of each participant.

With this arrangement, it will be apparent that when each participant turns to his right to face the reference display 24, the other participant will see that person turning to the other person's left, since the participants are facing each other. This turning ruins the appearance of an in-person conference session because it is comparable to persons in the same room facing each other, then turning in opposite directions so that each now faces a wall that is behind the other. This is contrary to the natural geometry of an in-person conference interaction. Maintaining the natural geometry of a remote conference interaction can be desirable to make a video conference environment more like an actual in-person conference session.

Figure 2:
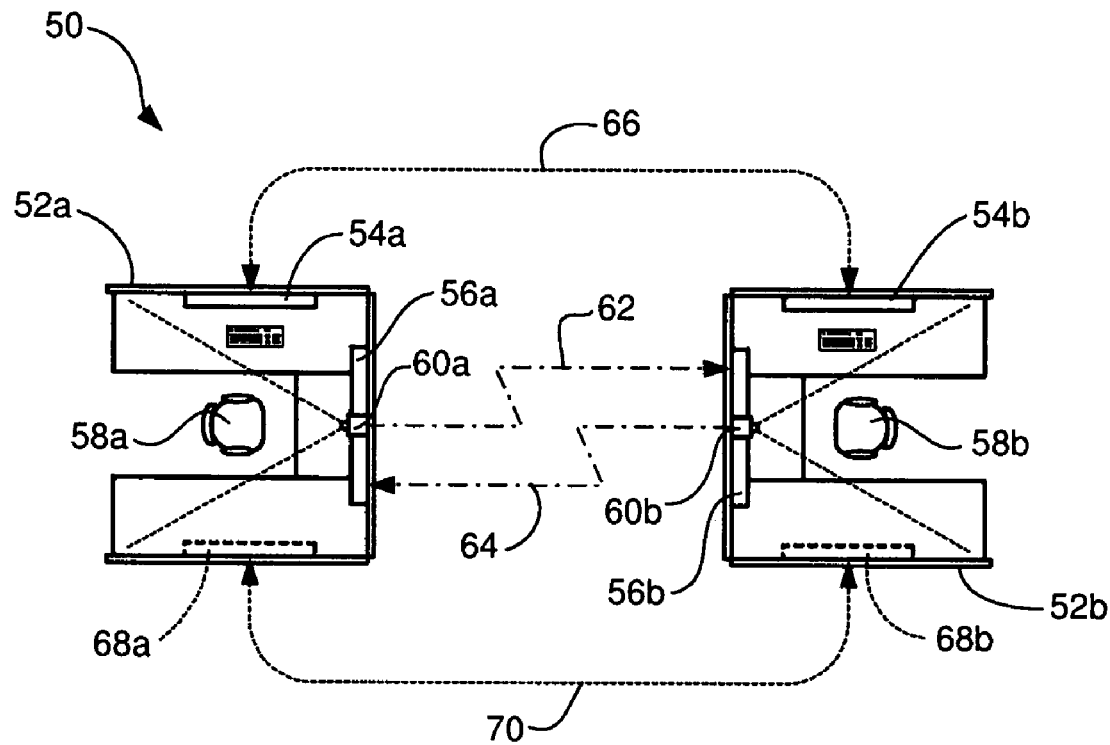
FIG. 2 is a plan view of one embodiment of a pair of cubicles that are interconnected in a video conference arrangement having symmetric reference directions.

Advantageously, the inventors have developed a remote collaboration system with symmetric media reference directions that maintains the natural geometry of a remote conference interaction. One embodiment of a remote collaboration system 50 with symmetric media reference directions is shown in FIG. 2. In the symmetric media system, reference items to the left of the camera in one room are placed to the right of the camera in the opposing room to maintain symmetry. Specifically, in FIG. 2 one video conference cubicle 52a is left-handed, having a reference display 54a to the left of the video conference display 56a (from the point of view of a conference participant sitting in the chair 58a), and the other cubicle 52b is left-handed, having a reference display 54b to the left of the video conference display 56b (from the point of view of a conference participant sitting in the chair 58b). Each cubicle includes a video conference camera 60, and these cameras are interconnected (as represented by dashed lines 62, 64) to the opposing video conference displays 56. The reference displays are interconnected, as represented by the dashed line 66, so that the conference participants can each refer to (and possibly manipulate) common information shown on these reference displays.

With this configuration, when the participants refer to media materials on the reference displays 54, each will see displayed in the video conference display 56 the image of the other turning to face in a common direction, thus maintaining the appearance of a side-by-side collaboration session. As with the representation in FIG. 1, the interconnections of the components of the remote conference environments in FIG. 2 are shown as logical connections only. These do not necessarily represent the actual configuration of the hardware that interconnects the two environments.

A variety of geometric configurations can be used and still provide a symmetric system. For example, the conference video may correspond to a side view, with a white board or data display corresponding to a front view. Alternatively, the video may correspond to a front view, with a white board or data display corresponding to a side view. Each of these and other alternative configurations can provide the illusion of a side-by-side collaborative session.

In addition to a single reference direction, video conference environments like those shown in FIG. 2 can have multiple reference directions. For example, the left-handed cubicle 52a can have a second reference display 68a (shown in dashed lines) positioned to the right of the video conference display 56a, so that this cubicle becomes ambidextrous—that is, the cubicle can be configured as either a right-handed or left-handed cubicle. Likewise, the right-handed cubicle 52b can have a second reference display 68b (shown in dashed lines) positioned to the left of the video conference display 56b, so that this cubicle too becomes ambidextrous. The second reference displays can be interconnected (as represented by dashed line 70) in a manner similar to the first reference displays 54. It will be apparent that an ambidextrous remote conference environment can interconnect with any other remote conference environment, whether it is right-handed or left-handed, and still maintain symmetry of reference. Additionally, ambidextrous environments can be interconnected with multiple reference displays in operation (two or more), providing a remote collaboration session with multiple symmetric reference directions.

Figure 3:
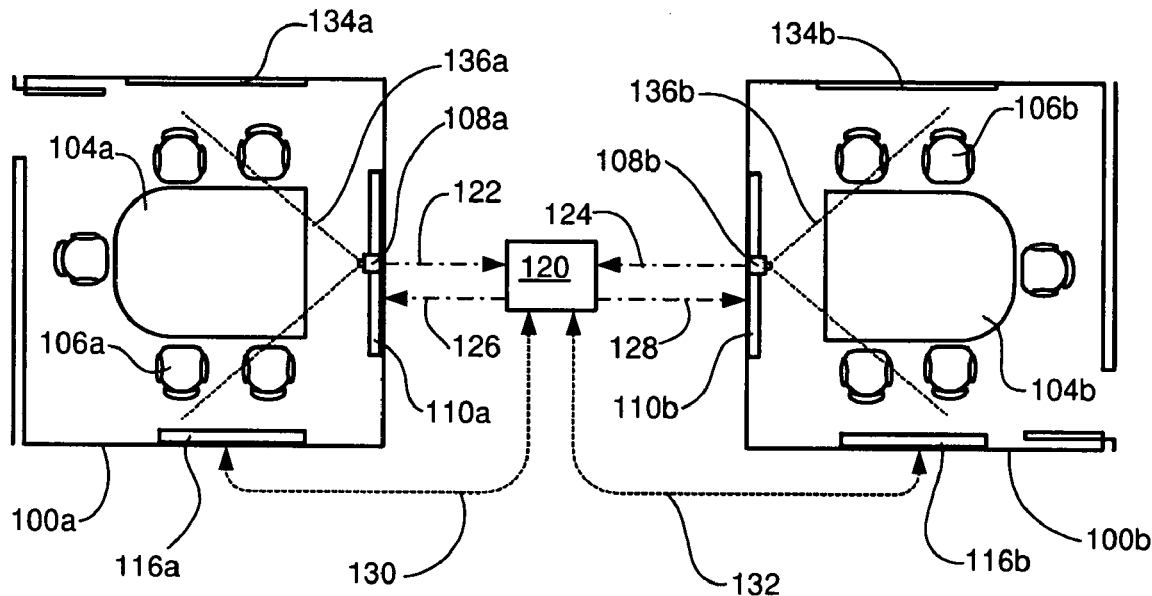
FIG. 3 is a plan view of one embodiment of a pair of conference rooms interconnected in a video conference arrangement having symmetric reference directions.

As noted above, the video conference environment is not limited to a cubicle sized for a single person, but can be a conference room or the like. Such an environment is shown in FIG. 3, where two remote conference rooms 100, each containing a conference table 104 and multiple chairs 106 for conference participants, are interconnected for remote collaboration. Each conference room includes a video conference camera 108 and a video conference display 110 positioned on one wall of the room, with can be referred to as the front wall. The camera of each room takes an image which is provided to the video conference display of the other room, providing the illusion that the conference participants are in adjacent rooms with a window therebetween.

Additionally, each room includes at least one reference display device 116. In the first conference room 100a the reference display 116*a* is positioned to the right of the video conference display 110*a*, making this a right-handed room, and in the second conference room 100*b* the reference display 116*b* is positioned to the left of the video conference display 110*b*, making this a left handed room. Since these rooms are opposite handed, the reference direction is symmetrical, creating the appearance of an in-person collaboration session. Though not shown in the various figures herein, it will be appreciated that the reference displays will typically be controlled by a microprocessor and data input devices (e.g. a PC with keyboard, mouse, etc.) to allow the conference participants to view and manipulate information displayed on the data display.

In FIG. 3 the interconnection of the remote conference rooms is shown in a way that more closely suggests one embodiment of an actual hardware connection. The two conference rooms are interconnected to a central computer system 120, which receives input signals from each video conference camera 108 (represented by dashed lines 122, 124) and provides a corresponding video output signal (represented by dashed lines 126, 128) to each video conference display 110. Similarly, the central computer system is interconnected via lines 130, 132 to the reference displays 116, so that information can be sent and received between the two displays. In addition to data displays, the conference rooms 100 can each include a conventional white board 134, or other devices that are commonly used in conference situations, whether video conferences or otherwise. Such devices can be placed within the field of view, indicated by dashed lines 136, of the video conference cameras in each room, or they can be outside that field of view.

Figure 4:
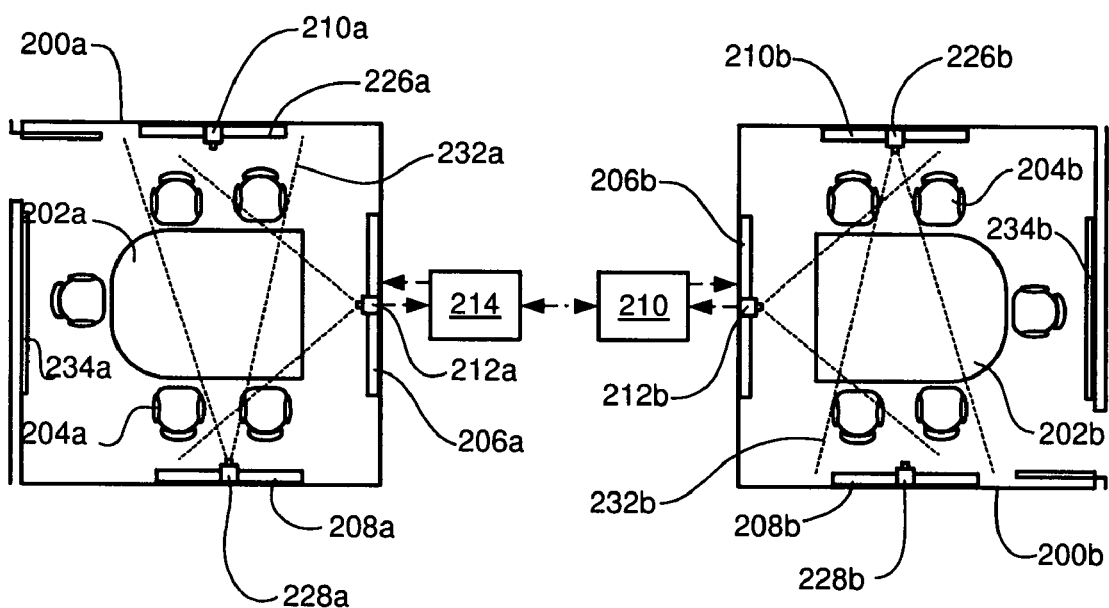
FIG. 4 is a plan view of one embodiment of a pair of video conference rooms with multiple cameras and reference devices for multiple symmetric reference directions.

Shown in FIG. 4 is another embodiment of a video conference environment having multiple display devices and multiple camera directions. As with the embodiment shown in FIG. 3, each conference room 200 includes a conference table 202 and chairs 204, along with a video conference display 206 at the front of each room, and two data displays 208, 210 located on sidewalls of the room. These rooms also include a video conference camera 212 located adjacent to the video conference display on the front wall of the room. The first video conference room is represented as being interconnected to a local computer system or server 214 that receives input from the video conference camera, and sends a signal to the first video conference display 212*a*, as represented by dashed lines. Likewise, the second video conference room is represented as being interconnected to a local computer system or server 220 that receives input from the video conference camera, and sends a signal to the second video conference display 212*b*, as represented by dashed lines. To allow the video conference, the two local computers or servers are interconnected, as represented by a dashed line, to allow the transmission of data and images. This interconnection can be via the Internet or other data connection systems. The interconnections of the data displays to the local computer or server devices associated with each room are not represented, but many possible configurations for these will be apparent to one of skill in the art.

In the embodiment of FIG. 4, additional video cameras 226, 228 are positioned in the room, having different points of view compared to the first video conference camera 212. While these additional cameras are shown as being positioned adjacent to the reference displays in each room, they can be positioned in other locations, whether near a reference display or not. These additional video cameras allow the rooms to be ambidextrous in several different configurations. For example, if the first conference room 200*a* is configured as a left handed conference room with the video conference display on the front wall (display 206*a*) and display 210*a* as the reference display, the second conference room 200*b* can be configured to be right handed to maintain symmetry. Given the additional cameras, this can be done in more than one way. In one configuration, the conference participants can face the video conference display 206*b*, with the right hand reference display 210*b* operating as the reference display. Alternatively, the conference participants can face the left hand reference display 208*b*, which can be actuated as the video conference display, with the center display 206*b* operating as a right-hand reference display. In this and other configurations the two conference rooms can be interconnected in a video conference with symmetric reference.

The additional cameras 226, 228 also allow additional views of conference participants, such as while interacting with one of the reference displays. For example, where data is displayed on the left-hand reference display 210*a* in the first conference room 200*a*, it can be desirable to transmit an image of a conference participant 230 standing near the display while pointing to and explaining the data. In such a case, it can be desirable for the participants in the second room 200*b* to see the person 230 as well as the displayed data on their right-hand reference display 210*b*. To do this, the camera 228*a* can be configured with a field of view (represented by dashed lines 232*a*) that encompasses the left hand reference display 210*a* in the first room, and perhaps also some area around it so as to take an image of objects near that display, such as the person 230. The corresponding image can then be displayed on the reference display 210*b* in the second room. In this situation the image provided on the reference display 210*b* can be a direct video feed of the data display and the person (e.g. with the video camera 228*a* phase locked with the reference display 210*a* to prevent flicker), or it can use video segmentation technology to superimpose a video image of the person in front of the reference display data, while leaving the reference display 210*b* as a data display. This allows conference participants to see and hear each other when discussing and using the reference materials, while also maintaining symmetry of reference.

The additional video cameras 226, 228 also allow the use of non-electronic media reference items. For example, where it is desired to use a conventional whiteboard 234 (e.g. not a digital whiteboard or data display) additional imaging devices can be provided to allow participants in each room to see participants in the other room interacting with it.

Figure 5:
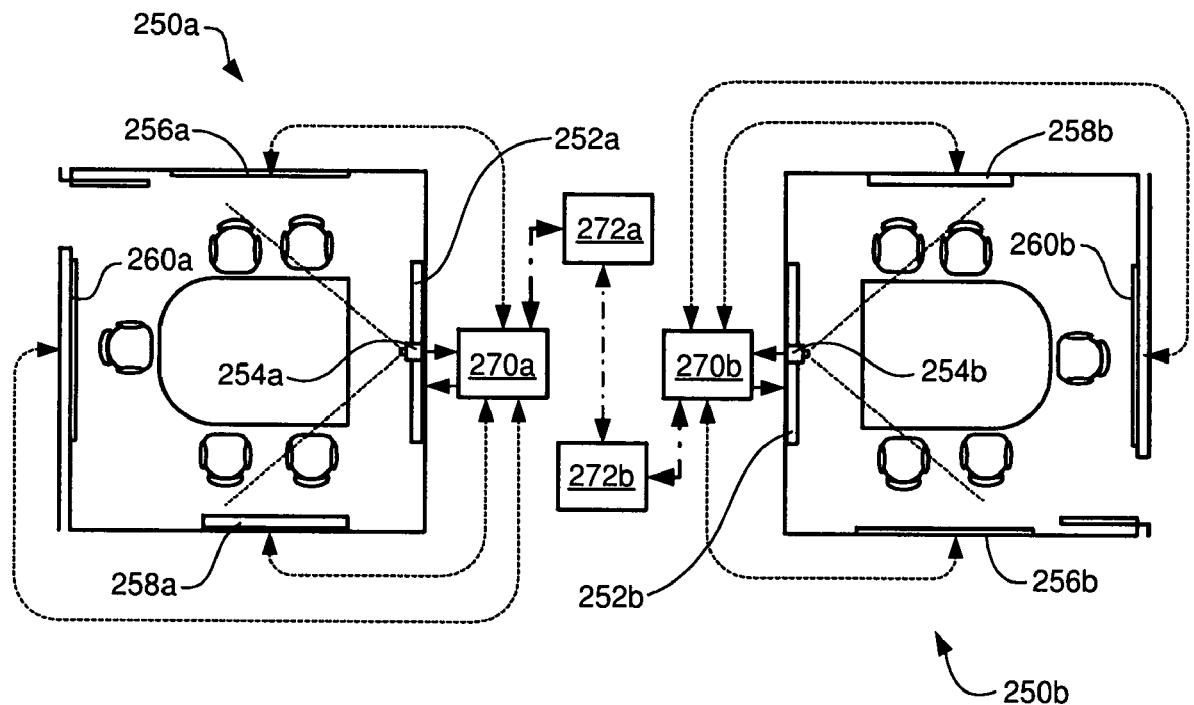
FIG. 5 is a plan view of one embodiment of a pair of video conference rooms having multiple reference devices with device correspondence and referential symmetry.

FIG. 5 is a plan view of one embodiment of a pair of video conference rooms having multiple reference devices with device correspondence and referential symmetry. Specifically, the embodiment of FIG. 5 shows two video conference environments 250*a*, 250*b*, each having multiple reference devices connected to a central control platform 280. The reference devices include a central reference display 252, a camera 254, a left reference display 256, a right reference display device 258, and a rear display device 260. Stream assignments for each of the reference devices can be made so that multiple reference devices can be symmetric at the same time. Because of the geometric arrangement, the central reference display 252 is always symmetric in this embodiment. Consequently, in this configuration it is possible to have information displayed correctly on all walls.

The flexibility of this connection system allows a variety of possible configurations while maintaining device correspondence and referential symmetry. Each reference device can be independently assigned correct streams as needed as directed by the central control platform 280. The setup could be easily extended to multipoint with the scheme illustrated in FIG. 11 with the correct participants assigned to the right and left reference displays. External media streams such as cable television or Internet feeds could be positioned correctly as needed.

In the video conference arrangement shown in FIG. 5, the arrangement for the interconnection of the two rooms is slightly different from that shown in the previous figures. In this configuration, the video conference components of each room (e.g. video displays, reference displays, cameras, etc.) are shown connected to a local computer or server 270, which in turn is connected to a second computer or server device or system 272. This second computer or server system can be a local area network or some other network that is interposed between the local computer system for each and the interconnection to the other room. These second computer or server devices are then interconnected to each other (e.g. via the Internet or some other network connection) to allow the conference data to flow back and forth. Any of these various computer or server devices can include firewall software and other software for the protection and facilitation of the video conference system.

Figure 6:
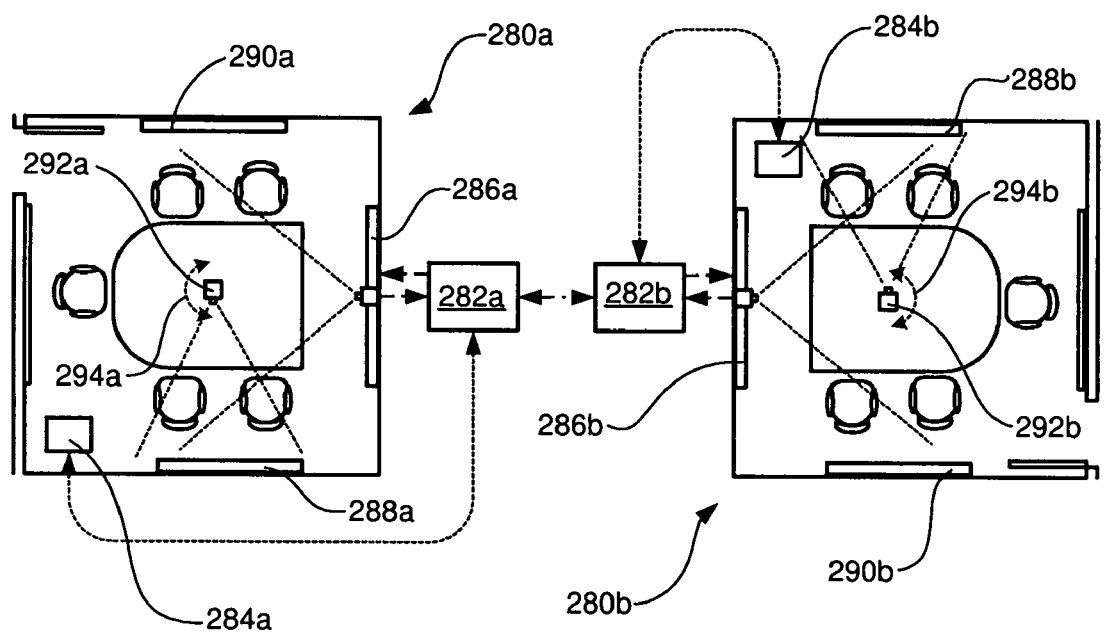
FIG. 6 is a plan view of one embodiment of a pair of video conference rooms having device correspondence without symmetry.

Shown in FIG. 6 is a plan view of one embodiment of a pair of video conference rooms 280 interconnected via local computer or network devices 282. These rooms provide an example of device correspondence without symmetry. Specifically, in this embodiment each room includes a printer 284 that is a reference device. However, since directional symmetry is not an issue with a printer device, these rooms have device correspondence without symmetry to this device, although other reference devices (e.g. the displays 286, 288 and 290, and associated cameras) could still have symmetry.

An example of another approach for providing symmetrical reference is also provided in FIG. 6. A single panning document or white board camera 292 can be mounted centrally in the room (e.g. mounted to the ceiling) and can pan left or right to achieve symmetry. The camera can be rotated as indicated by arrow 294 to point to the left, right, rear, etc. In this way one camera can be used to achieve symmetry, rather than two. For example, for a left-handed room, the camera can be caused to point to the reference display on the left side. For a right-handed room, the camera can be made to point to the reference display on the right side. This approach can be less expensive and more practical to install. It is to be recognized, however, that it is possible to use only one reference side at a time if there is only one camera. Nevertheless, having a camera that can be repositioned to achieve symmetry is another approach that can provide video conference sessions with symmetric reference.

Figure 7:
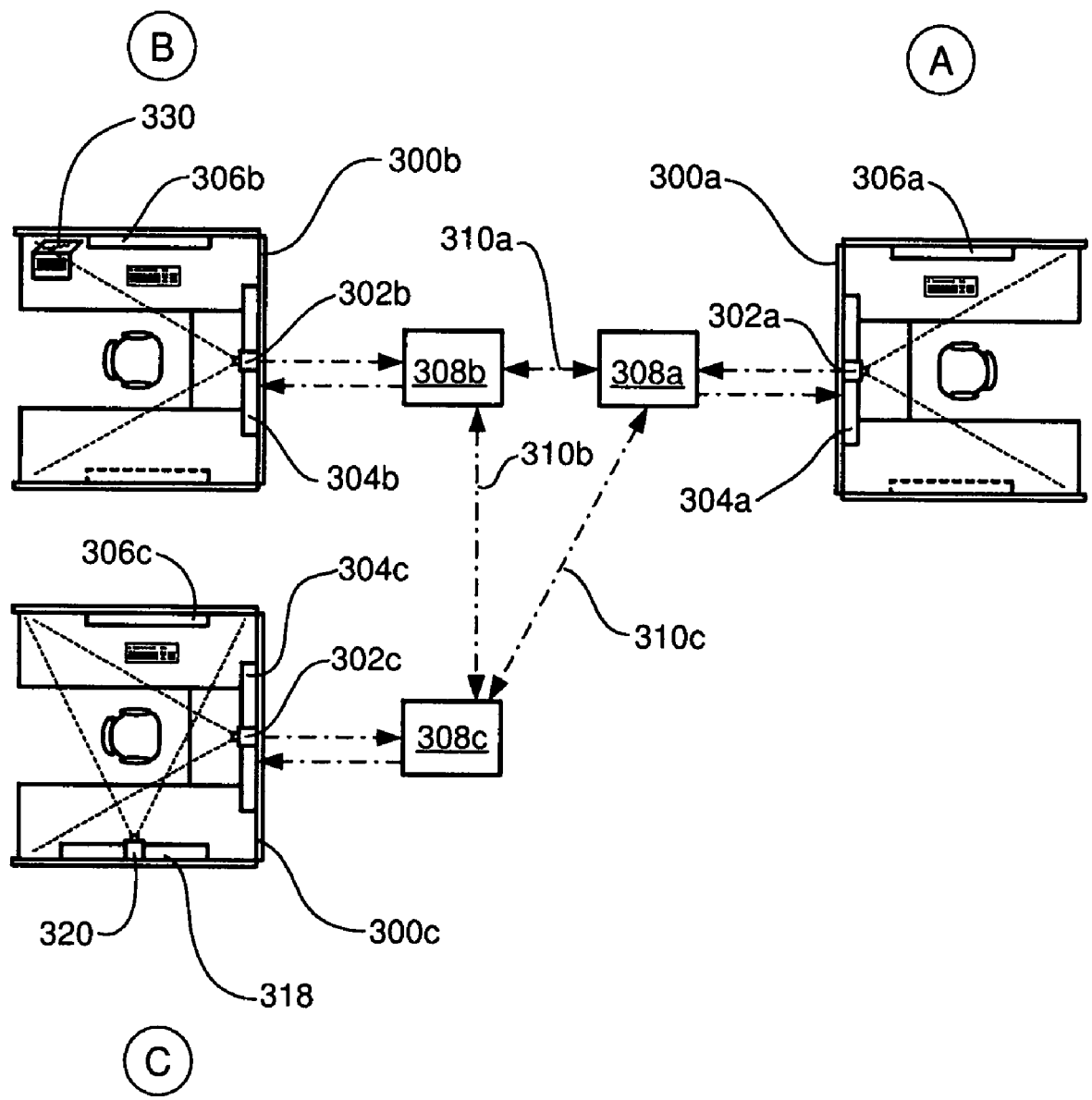
FIG. 7 is a plan view of one embodiment of three cubicles interconnected in a three-way video conference arrangement.

While the video conference configurations shown in FIGS. 1-6 depict only two interconnected video conference rooms, symmetric reference directions can also be provided where more than two video conference environments are simultaneously interconnected. One such situation is shown in FIG. 7, where three video conference cubicles 300, labeled "A", "B" and "C", are interconnected in a collaborative session. Each cubicle includes a video camera 302 and a video conference display 304 located at the front of the cube (opposite the entrance direction), and a reference display 306 to one side or the other. Cubicle "A" is a right-handed cube, having the reference display 306*a* to the right side as one enters the cube. Cubicles B and C are left-handed cubes, having reference displays 306*b*, 306*c* to the left as one enters the cube.

The conference components of each cubicle 300 are interconnected to and controlled by a local computer or server device 308, and these devices are interconnected to each other, as indicated by the dashed line 310. The single line that represents the connection of each local computer or server is not intended to suggest that these local devices are necessarily directly connected to each other. Additional hardware and systems can be interposed between them, as discussed above.

Figure 8A:
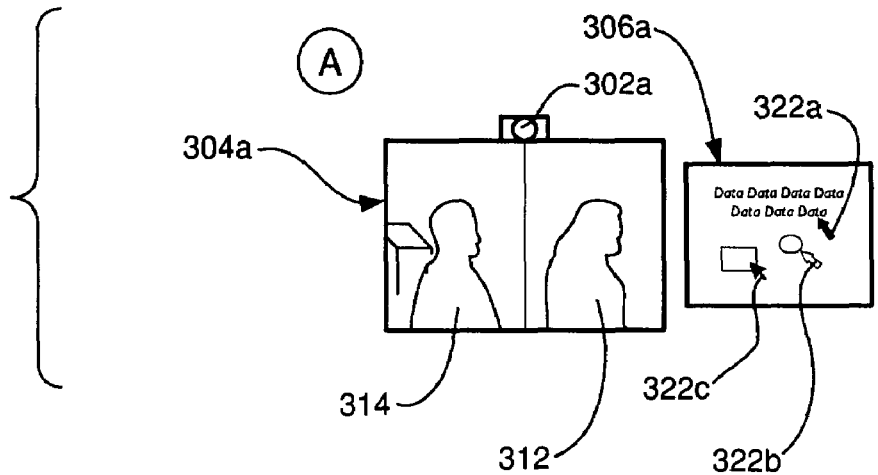
FIGS. 8A-8C depict video conference and data reference images for each user of the three-way video conference arrangement of FIG. 7, and showing one approach to addressing referential asymmetry.
Figure 8B:
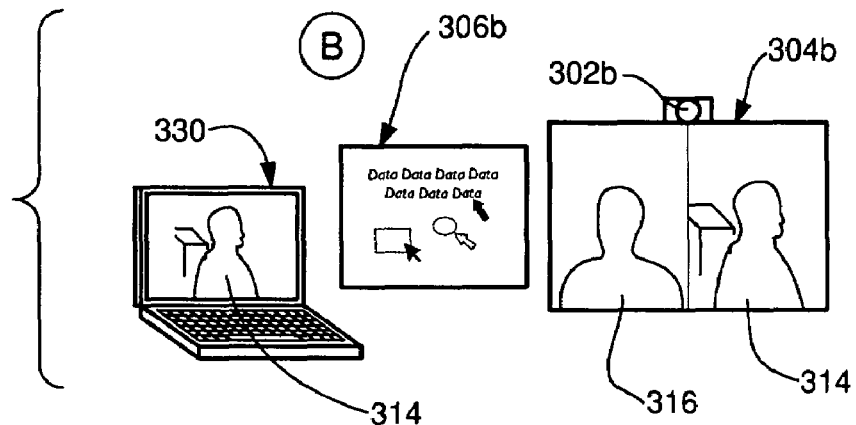
Figure 8C:
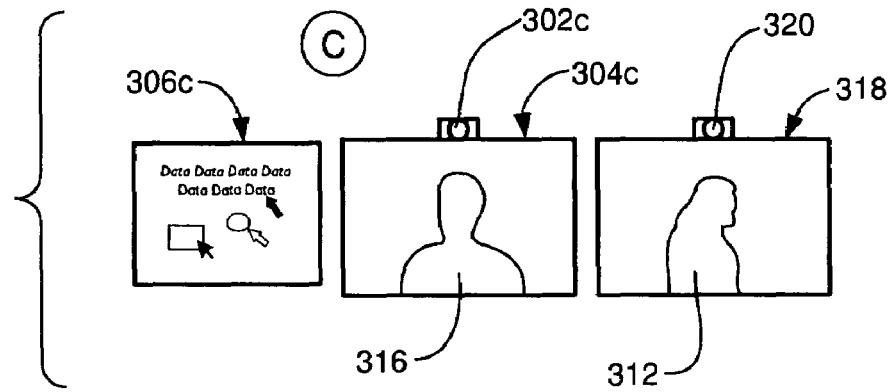

The video conference and data displays associated with each cubicle 300 of FIG. 7 are shown in their relative positions in FIGS. 8A-8C. Where more than two participants are included in a single video conference, the images of the respective participants can be provided on a single split screen video conference display in each cubicle. For example, as shown in FIG. 8A, the video conference display 304*a* in cubicle A can be a split screen, showing an image 312 of the participant that is in cubicle B on one side of the screen, and an image 314 of the participant from cubicle C on the other. Cubicle B is also depicted as having a split screen display 304*b*, which shows the image 314 of the participant from cubicle C, and an image 316 of the participant from cubicle A. Alternatively, as shown in FIG. 8C, a video conference environment can use multiple video conference displays to show multiple other conference participants. Specifically, as shown in FIG. 7, cubicle C includes a second display device 318 that is to the right of the video conference display 304*c*. As shown in FIG. 8C, this second display device can provide an image 312 of the participant in cubicle B (300*b*) while the first video conference display 304*c* shows an image 316 of the participant from cubicle B. An additional video camera 320 can also be positioned near the second display 318 to provide an additional viewpoint, as discussed above.

The reference displays 306 are oriented in the manner indicated above. That is, the reference display 306*a* is to the right of the video conference display 304*a* in cubicle A, because cubicle A is a right-handed cubicle in this arrangement. On the other hand, the respective reference displays 306*b*, 306*c* are located to the left of their respective video conference displays because these are configured as left-handed cubicles in this example. To facilitate the use of the digital reference displays 306, the reference display can include multiple pointers 322, each having a unique appearance, to allow each conference participant to refer to different portions of the data display during the conference, as if all were in the same room and pointing with their fingers to different portions of a drawing or text on a conventional white board. For example, the solid block arrow pointer 322*a* can be in the control of the participant in cubicle A, the outline block arrow 322*b* in the control of cubicle B, and the bold line arrow pointer 322*c* in the control of cubicle C.

One aspect of the three-way video conference situation that is apparent from FIGS. 8A-8C is an asymmetry in the video images. Specifically, since cubicle A (300*a*) is right-handed and cubicles B and C (300*b*, 300*c*) are left-handed, the participant in cubicle A will see both other participants facing the proper direction with respect to the reference display 306. That is, viewing FIG. 8A, when all participants are viewing their respective reference displays, the images 312 and 314 of the other participants will both face the reference display 306*a* on the cubicle A viewer's right. Likewise, since cubicles B and C are left-handed, the participants in cubicles B and C will see the image of the participant in cubicle A facing in the correct direction with respect to the reference display because cubicle A is right-handed. That is, when all participants are viewing their respective reference displays, the image 316 of the participant in cubicle A faces to the left toward the reference displays 306*b* and 306*c* in FIGS. 8B and 8C.

However, symmetry is not maintained between cubicles B and C because these are both left-handed cubicles. This is apparent from FIGS. 8B and 8C where the image 314 of the participant from cubicle C faces to the right as seen in cubicle B (FIG. 8B) and the participant from cubicle B faces to the right as seen in cubicle C (FIG. 8C). The inventors have devised several approaches to address this asymmetry. One of these approaches is illustrated in FIGS. 7 and 8B, and involves the use of a moveable display. Cubicle B can be provided with a moveable display device 330, which in this case is a laptop computer. It will be apparent that other types of moveable display devices can also be used. Where a video conference image of another participant is not symmetrical with respect to the reference display, the moveable display device can be moved to the opposite side of the reference display to maintain symmetry. In this case, since the participant in cubicle B will see the image 314 of the participant from cubicle C facing to the right rather than the left, the moveable display can be positioned on the left of the reference display 306b so that the image 314 of the other participant now appears to be facing the reference display. It will be apparent that the image 314 of that participant that would appear on the video conference display 314b is not needed in this case, and can be eliminated.

Figure 9A:
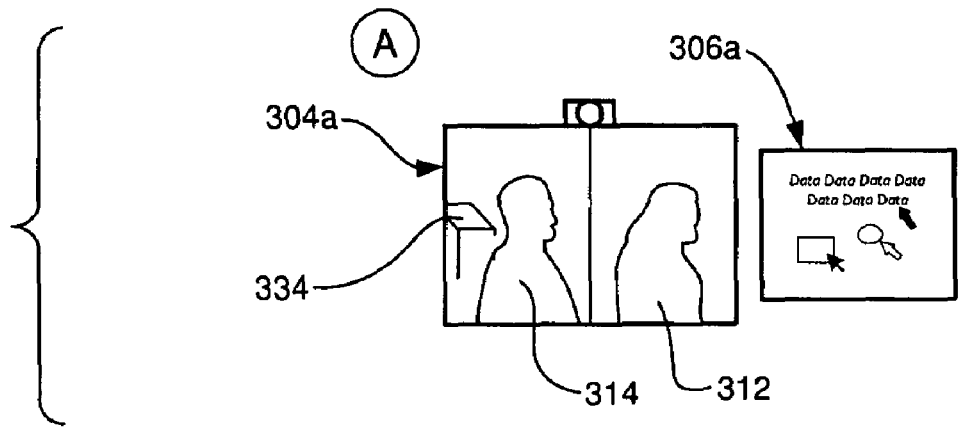
FIGS. 9A-9C depict video conference and data reference images for each user of the video conference arrangement of FIG. 7 where horizontal inversion has been used to correct referential asymmetry.
Figure 9B:
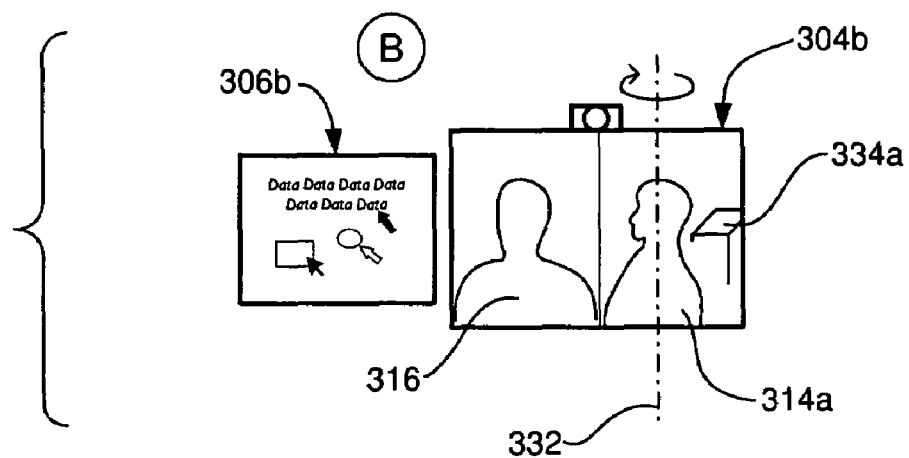

Another option for dealing with asymmetry in a three or more cubicle conference connection is to horizontally invert a video conference display. This approach is shown in FIG. 9B. The image 314a of the participant in cubicle C is horizontally inverted, that is rotated about a vertical axis 332, so that the appears image faces the reference display 306b. This approach involves the video conference image of conference participant being displayed as a mirror image, which can be readily done using appropriate software for the display system. It will be apparent that, when an image is horizontally inverted, objects in the background will reverse their apparent position. For example, any objects or textual materials that appear in the inverted video conference images (e.g. in the background, etc.) will be mirror images of themselves. This phenomenon is apparent by comparing FIGS. 9A and 9B. In FIG. 9A the direct, non-inverted image 314 of the participant from cubicle C is shown on the left side of the video conference display 304a. In this image a background object 334 is visible. When the image is horizontally inverted, as shown in FIG. 9B, the background object 334a appears on the other side of the conference display view and appears as a mirror image of itself. It will be apparent that a horizontal inversion will also reverse alphanumeric characters and the like that may be visible in the video display. This factor can be taken into account when the video conference session is initiated. However, while the inverted image of the conference participant will be a mirror image of the actual person, the image will be unaffected otherwise.

Figure 9C:
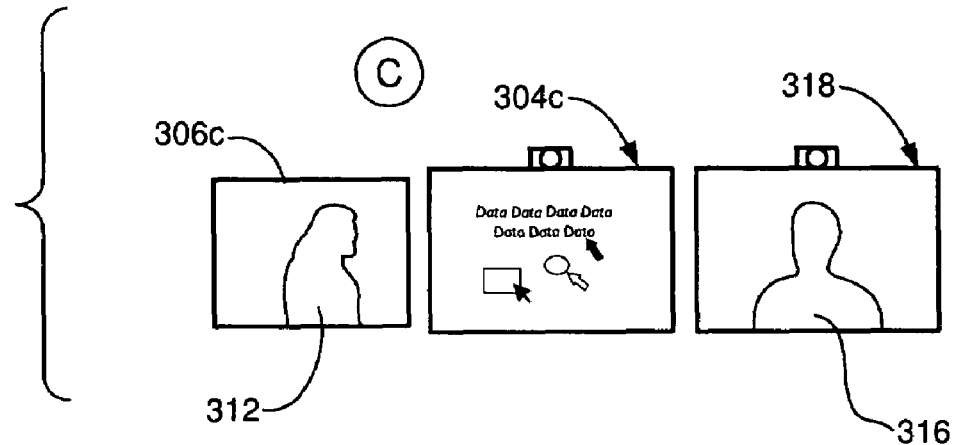

Another option to deal with an asymmetry problem in a multiple conference connection is to shift display positions in an ambidextrous cubicle. For example, viewing FIG. 7, cubicle C is ambidextrous because it includes reference displays 306c and 318 on either side of the video conference display. It is to be appreciated that the reference displays can be used as alternate video conference displays. Consequently, an asymmetrical condition can be addressed by shifting the relative positions of the video and reference displays. The results of this approach are shown in FIG. 9C. The asymmetry that is apparent in FIG. 8C can be addressed by moving the reference display contents to the center video conference 304c, moving the image 316 of the conference participant from cubicle A to display 318, and moving the image of the participant from cubicle B to the display 306c. The results of shifting this ambidextrous environment are shown in FIG. 9C. To maintain cubicle C as a left-handed cubicle, the camera 320 that is located near display 318 can be used as the video conference camera, rather than camera 302c.

Figure 13:
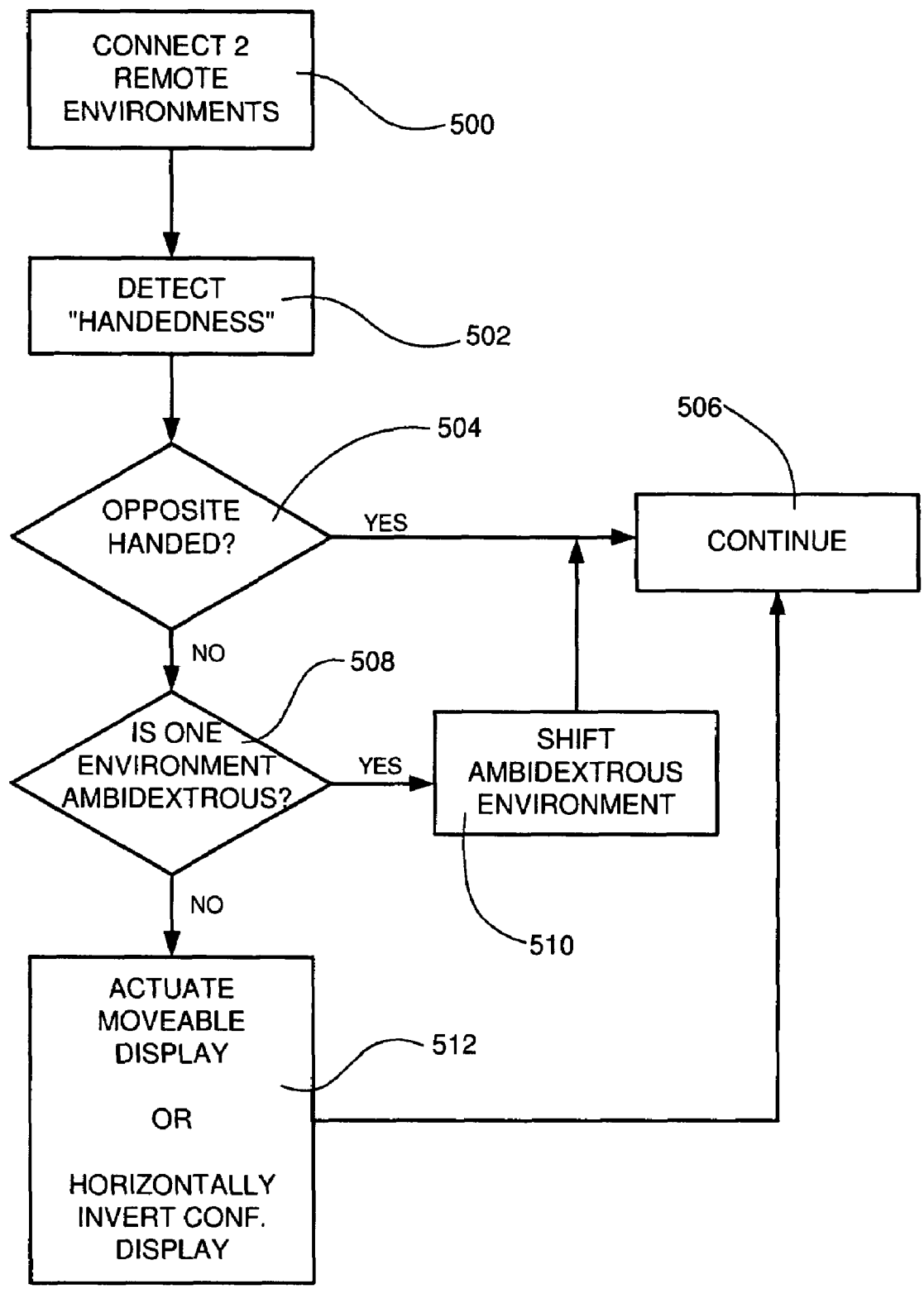
FIG. 13 is a flowchart of one embodiment of the steps involved in interconnecting two remote conference environments with symmetric reference directions.

This approach of shifting the display positions of an ambidextrous cubicle can also be used with a two-way conference connection. That is, since an ambidextrous cubicle can be configured as either right-handed or left-handed, it can interconnect to any other cubicle and still maintain symmetry of reference. One embodiment of the basic steps in interconnecting two video conference environments is outlined in the flow chart of FIG. 13. After the two conference environments are interconnected (step 500), the system checks the "handedness" of each environment (step 502), and queries whether the two environments are opposite handed (step 504). If the two environments are opposite handed, symmetry will be maintained and the conference session can proceed (step 506). However, if the two environments are not opposite handed (e.g. R-R or L-L) the system next queries whether one of the conference environments is ambidextrous (step 508). If so, the image positions in the ambidextrous environment can be shifted (step 510) and the conference can proceed with symmetry maintained.

If neither of the two environments are ambidextrous, two other options remain (step 512) to allow referential symmetry to be preserved. One option is to actuate a moveable display, as discussed above. Another option is to horizontally invert the video conference display image of both of the participants. This will allow each to see the other as a mirror image, so that reference directions will appear the same for each.

Figure 10:
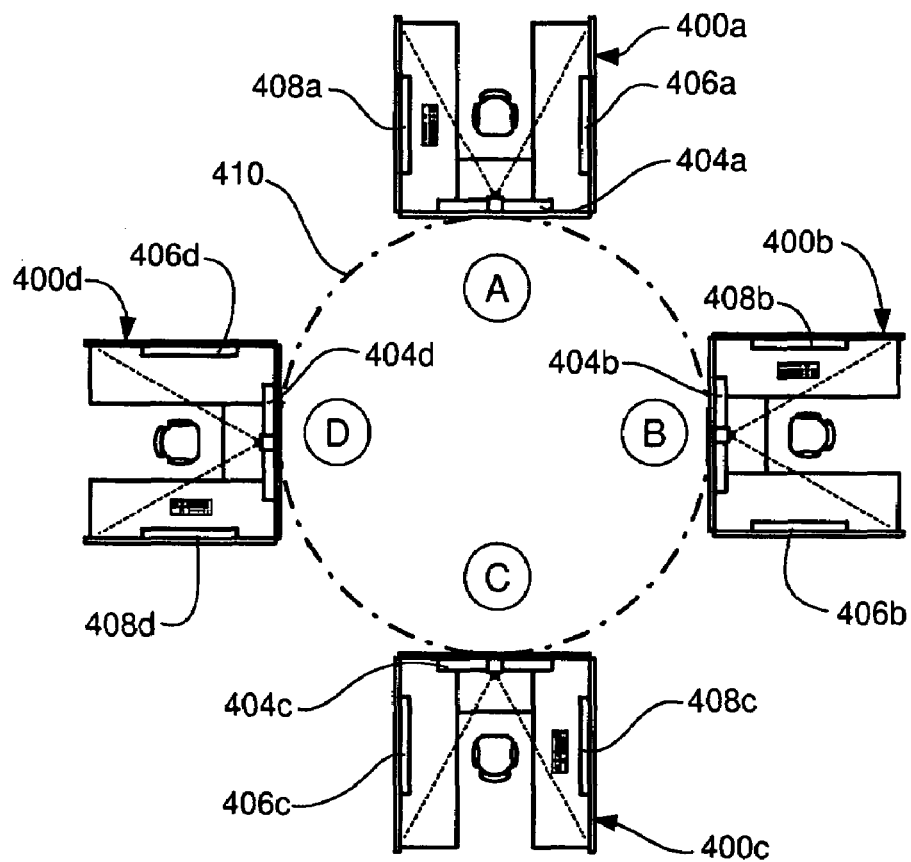
FIG. 10 is a plan view of four cubicles interconnected in a roundtable video conference arrangement.
Figure 11:
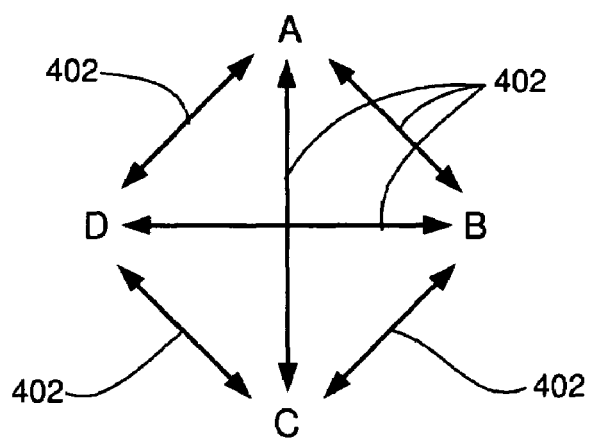
FIG. 11 is a diagram of the number of individual "connections" required in the video conference arrangement shown in FIG. 10.

Maintaining referential symmetry becomes more difficult when three or more video conference environments are interconnected. The three-way conference session has been discussed above. Shown in FIG. 10 is a four-way conference session set up in a roundtable format. That is, while each conference cubicle 400 (labeled A-D) is at a location that is remote from the others, they are shown arranged as if in a circle. As shown in FIG. 11, it will be apparent that in this configuration there will be eight effective connections 402 between the different cubicles, since a video image from each must be transmitted to each of the others. The cubicles 400 shown in FIG. 10 are depicted as being ambidextrous. However, since there are four cubicles and each includes three displays, shifting image positions in ambidextrous cubicles will not solve the asymmetry problem for all. This condition is illustrated in FIGS. 12A-12D, which show the display configuration of each cubicle in the roundtable arrangement of FIG. 10. In this example, the video conference display 404 of each cubicle is configured as a split screen, with the images of three conference participants being shown on each display. Reference displays 406 and 408 are located to the left and right, respectively, of each split screen video conference display.

Figure 12A:
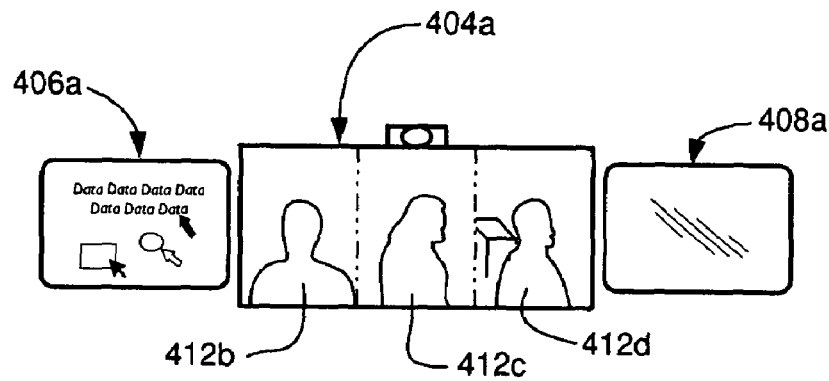
FIGS. 12A-12D depict one embodiment of the video conference and data reference images for each user of the roundtable video conference arrangement of FIG. 10.
Figure 12B:
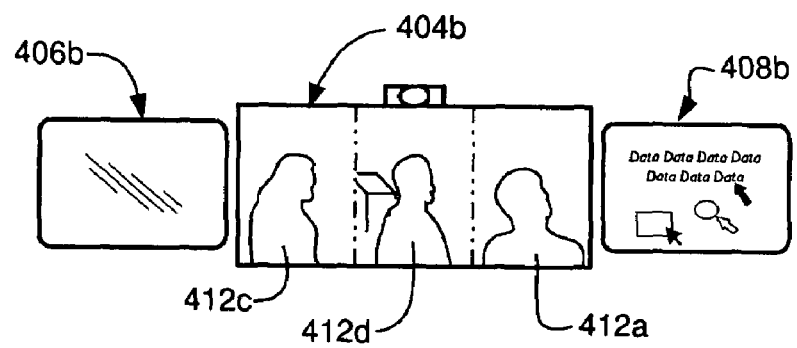

In the roundtable format, the images of the conference participants appear in positions that correspond to their position on the virtual roundtable (410 in FIG. 10). That is, as shown in FIG. 12A, the participant in cubicle A sees the image 412b of the person from cubicle B to the left, the image 412d of the person in cubicle D on the right, and the image 412c of the person in cubicle C in the center. The same roundtable positioning scheme is followed for the video conference displays of the other cubicles. In the configuration shown in FIGS. 12A-D, cubicle B is presumed to be a right-handed cubicle, while the other cubicles are left-handed. Consequently, the right side reference display 408b of cubicle B will be active, and the image 412b of the participant in cubicle B will appear to look to the left in each video image in the other cubicles. Conversely, the left side reference display 406b of cubicles A, C and D will be active, and the images 412a, 412b and 412c of the participants in cubicles A, C and D will appear to look to the right in each video image in the other cubicles.

Figure 12C:
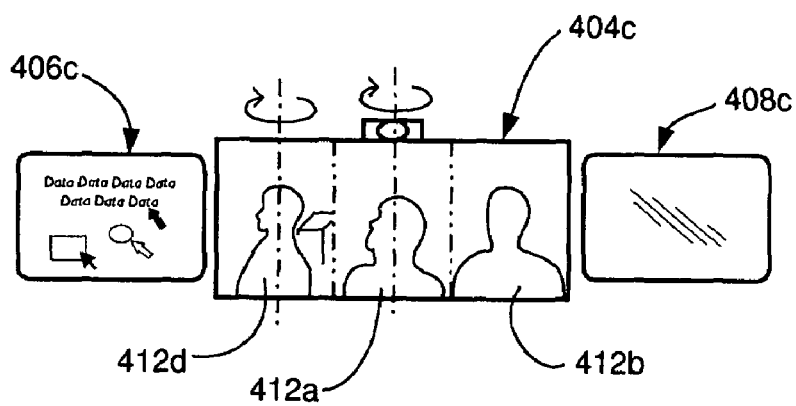
Figure 12D:
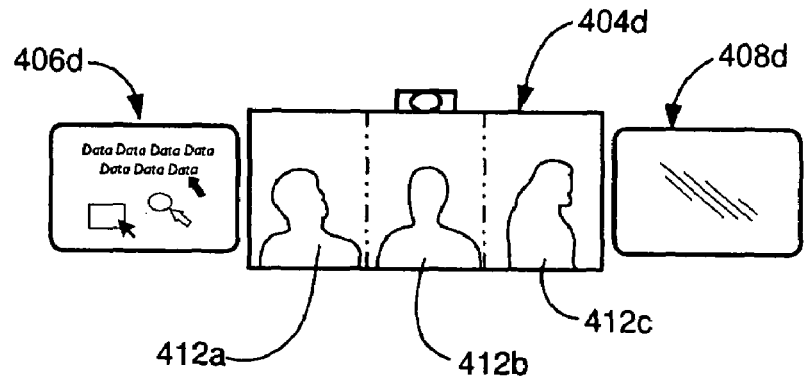

This configuration provides symmetric reference between cubicle B and the rest, but not between cubicles A, C and D. That is, the other participants all appear to face the active reference display from the viewpoint of the participant in cubicle B, and the participant from cubicle B appears to face the active reference display in each of the other cubicles. If it is desired only to have the images of participants appearing to look in the direction of the active reference display in each cubicle, the options of shifting positions in an ambidextrous environment, using a moveable display, or horizontal inversion of images can all be used. However, shifting image positions in an ambidextrous environment or with a moveable display will have the effect of eliminating the roundtable symmetry.

Where it is desired to maintain the roundtable symmetry and maintain symmetric reference directions in a multiple connection roundtable conference configuration, horizontal inversion is an effective option. This approach is illustrated in FIG. 12C, where the images 412a and 412d of the participants from cubicles A and D are horizontally inverted so as to face the active reference display 406c, and are in the proper position to maintain the roundtable symmetry. It will be apparent that this same approach can be taken with respect to each of the other cubicles.

Figure 14:
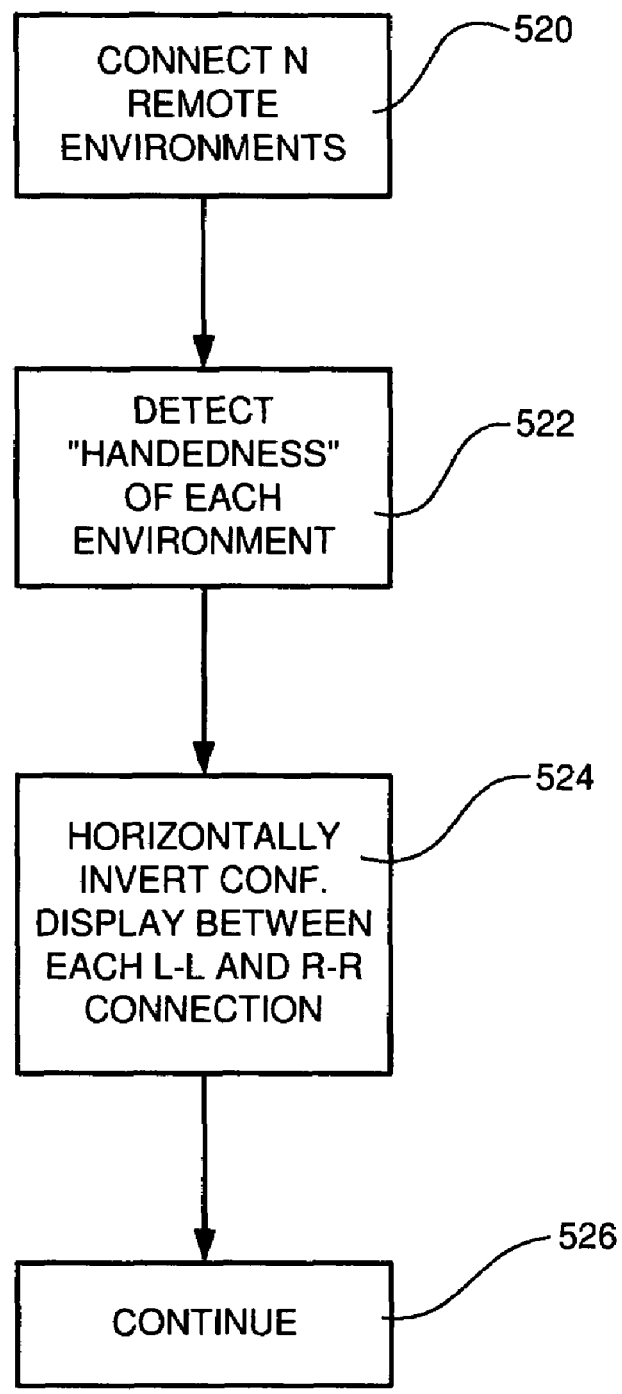
FIG. 14 is a flowchart of one embodiment of the steps involved in interconnecting N remote conference environments in order to provide symmetric reference directions.

One embodiment of the analytical steps involved in maintaining symmetry in a multiple connection video conference situation are outlined in the flowchart of FIG. 14. Where it is desired to connect some number N of remote conference environments (step 520), the system detects the "handedness" of each environment (step 522). The system can then horizontally invert the video conference display between each L-L and R-R connection (step 524) before proceeding with the conference (step 526). In this way, symmetric reference directions are maintained, as are display positions.

The various embodiments disclosed herein provide a video conferencing system with symmetric positioning of media or reference materials to give the illusion of a side-by-side collaborative session with symmetrical reference directions. It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A video conference system, comprising:
a first video conference environment; and
a second video conference environment linked to the first video conference environment, each video conference environment including a conference view direction and a reference view direction, the conference view direction being defined as looking into a camera in a respective video conference environment, the reference view direction being defined by a resource that is right or left of said conference view direction and to which a conference participant will refer during a video conference; and
if said first and second video conference environments initially have a same reference view direction, making adjustments such that said first and second video conference environments functionally have different reference view directions.

2. A video conference system in accordance with claim 1, wherein the resource defining the reference view direction comprises a reference display on a right or left side of the conference view direction.

3. A video conference system in accordance with claim 1, wherein at least one of the video conference environments includes more than one reference view direction.

4. A video conference system in accordance with claim 1, wherein at least one of the video conference environments includes more than one video conference camera, whereby the conference view direction can be varied.

5. A video conference system in accordance with claim 4, wherein at least one video conference camera in at least one video conference environment is oriented toward a reference view direction.

6. A video conference system in accordance with claim 1, further comprising at least one additional video conference environment linked to the first and second video conference environments, the at least one additional video conference environment including a conference view direction and a reference view direction, the reference view direction being symmetrically oriented with respect to the conference view direction of at least one of the first and second video conference environments.

7. A video conference system in accordance with claim 1, wherein said making adjustments comprises moving a moveable video display to a position on an opposite side of said reference view direction from an initial position of said moveable video display.

8. A video conference system in accordance with claim 1, wherein at least one of the video conference environments is ambidextrous, having reference displays on a right side and left side of the conference view direction, the reference displays being selectively useable as video conference displays; and
wherein said making adjustments comprises choosing one of said reference displays such that said first and second video conference environments functionally have different reference view directions.

9. A video conference system in accordance with claim 1, wherein said making adjustments comprises a video conference image from at least one of the first and second video conference environments being horizontally inverted in the video conference display of the at least one additional video conference environment such that said first and second video conference environments functionally have different reference view directions.

10. A video conference system in accordance with claim 6, comprising at least four video conference environments interconnected with roundtable symmetry.

11. A method for remote collaboration, comprising the steps of:
interconnecting at least two video conference environments having a video conference view direction and a reference direction; and
actuating a reference display positioned in the reference direction, such that the video conference view direction and reference direction are symmetrical between the at least two video conference environments.

12. A method in accordance with claim 11, further comprising the step of manipulating at least one of the video conference view direction and the reference direction, such that the video conference view direction and reference direction are symmetrical between the at least two video conference environments.

13. A method in accordance with claim 12, wherein the step of manipulating at least one of the video conference view direction and the reference direction comprises a step selected from the group consisting of:

switching at least one of a video conference display position and reference display position in an ambidextrous video conference environment;
positioning a moveable video conference display on a different side of the reference display; and
horizontally inverting at least one video conference image of a video conference participant.

14. A method in accordance with claim 11, wherein the step of interconnecting the at least two video conference environments comprises:
interconnecting at least three video conference environments, each environment having a video conference view direction and at least one reference direction;
actuating a reference display positioned in the reference direction between a first two of the three video conference environments that are opposite handed; and
manipulating at least one of the video conference view direction and the reference direction of a third video conference environment, such that the video conference view direction and reference direction are symmetrical between the third environment and first two video conference environments.

15. A method in accordance with claim 11, wherein the step of interconnecting the at least two video conference environments comprises:
interconnecting at least three video conference environments, each environment having a video conference view direction with roundtable symmetry with respect to the other video conference environments, and at least one reference direction;
actuating a reference display positioned in the reference direction between any two of the video conference environments that are opposite handed; and
manipulating at least one of the video conference view direction and the reference direction of each video conference interconnection between environments that are not opposite handed, such that the video conference view direction and reference direction are symmetrical between all of the at least three video conference environments.

a method for remote collaboration, comprising the steps of:
interconnecting at least two video conference environments having a video conference view direction and a reference direction; and
actuating a reference display positioned in the reference direction, such that the video conference view direction and reference direction are symmetrical between the at least two video conference environments.

16. A method for remote collaboration, comprising the computer implemented steps of:
interconnecting at least two remote video conference environments;
providing video conference display data from each video conference environment to a first display in each video conference environment;
providing common reference data to a second display in each video conference environment, the respective positions of the first and second displays defining a handedness of each environment; and
causing each connection between each of the at least two video conference environments to be opposite handed.

17. A method in accordance with claim 16, wherein the step of causing each connection between each of the at least two video conference environments to be opposite handed further comprises:
detecting the handedness of each video conference environment; and
manipulating at least one of the first and second displays between any two video conference environments that are like-handed, such that the any two environments appear to be opposite handed.

18. A method in accordance with claim 17, wherein the step of manipulating at least one of the first and second displays comprises a step selected from the group consisting of:
switching at least one of a video conference display position and reference display position in an ambidextrous video conference environment;
actuating a moveable video conference display positioned on a different side of the reference display; and
horizontally inverting at least one video conference image of a video conference participant.

19. A method in accordance with claim 16, further comprising the step of actuating a video conference camera in at least one video conference environment to take an image of a reference display in the at least one video conference environment.

20. A method in accordance with claim 16, wherein the step of interconnecting at least two remote video conference environments comprises interconnecting at least three video conference environments, each environment having a video conference view direction with roundtable symmetry with respect to the other video conference environments.

* * * * *

UNITED STATES PATENT AND TRADEMARK OFFICE
CERTIFICATE OF CORRECTION

| | | |
|---|---|---|
| PATENT NO. | : 8,330,791 B2 | Page 1 of 1 |
| APPLICATION NO. | : 11/799277 | |
| DATED | : December 11, 2012 | |
| INVENTOR(S) | : Mark E. Gorzynski et al. | |

It is certified that error appears in the above-identified patent and that said Letters Patent is hereby corrected as shown below:

In the Claims:

In columns 13 and 14, lines 42-47 and 1-2, in Claim 15, below "environments." delete "a method for remote collaboration, comprising the steps of:

interconnecting at least two video conference environments having a video conference view direction and a reference direction; and actuating a reference display positioned in the reference direction, such that the video conference view direction and reference direction are symmetrical between the at least two video conference environments.".

Signed and Sealed this
Fourth Day of June, 2013

Teresa Stanek Rea
*Acting Director of the United States Patent and Trademark Office*